United States Patent
Al-Shafei et al.

(10) Patent No.: US 11,618,013 B2
(45) Date of Patent: Apr. 4, 2023

(54) SYSTEMS AND METHODS FOR THE SYNTHESIZING ZSM-22 ZEOLITES

(71) Applicants: Saudi Arabian Oil Company, Dhahran (SA); King Fahd University of Petroleum & Minerals, Dhahran (SA)

(72) Inventors: Emad Al-Shafei, Dhahran (SA); Oki Muraza, Dhahran (SA); Anas Karrar Jamil, Al-Khobar (SA); Ki-Hyouk Choi, Dhahran (SA); Ashok K. Punetha, Dhahran (SA); Zain Hassan Yamani, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 208 days.

(21) Appl. No.: 17/206,938

(22) Filed: Mar. 19, 2021

(65) Prior Publication Data
US 2022/0297098 A1    Sep. 22, 2022

(51) Int. Cl.
| | |
|---|---|
| *C01B 39/02* | (2006.01) |
| *B01J 29/70* | (2006.01) |
| *B01J 6/00* | (2006.01) |
| *B01J 19/00* | (2006.01) |
| *B01J 19/28* | (2006.01) |
| *B01J 35/02* | (2006.01) |
| *B01J 37/04* | (2006.01) |
| *B01J 37/08* | (2006.01) |
| *C10G 11/05* | (2006.01) |
| *C01B 39/48* | (2006.01) |
| *C01B 39/46* | (2006.01) |

(52) U.S. Cl.
CPC .......... *B01J 29/7042* (2013.01); *B01J 6/002* (2013.01); *B01J 19/0013* (2013.01); *B01J 19/28* (2013.01); *B01J 35/023* (2013.01); *B01J 37/04* (2013.01); *B01J 37/08* (2013.01); *C01B 39/02* (2013.01); *C01B 39/46* (2013.01); *C01B 39/48* (2013.01); *C10G 11/05* (2013.01); *B01J 2219/0009* (2013.01); *B01J 2219/00189* (2013.01); *C10G 2300/1044* (2013.01); *C10G 2300/703* (2013.01); *C10G 2400/20* (2013.01); *C10G 2400/22* (2013.01)

(58) Field of Classification Search
CPC .......... B01J 29/7042; B01J 2219/0009; B01J 2219/00189; B01J 6/002; B01J 19/0013; B01J 19/28; B01J 35/023; B01J 37/04; B01J 37/08; C10G 11/05; C10G 2300/1044; C10G 2300/703; C10G 2400/20; C10G 2400/22; Y02P 20/151; Y02P 20/52; Y02C 20/40; C01B 39/02; C01B 39/46; C01B 39/48

USPC .... 502/60, 77; 423/700, 701, 704, 705, 707, 423/708
See application file for complete search history.

(56) References Cited

U.S. PATENT DOCUMENTS

| | | | |
|---|---|---|---|
| 4,481,177 | A | 11/1984 | Valyocsik |
| 4,556,477 | A | 12/1985 | Dwyer |
| 4,717,465 | A | 1/1988 | Chen et al. |
| 5,157,194 | A | 10/1992 | Rahmim et al. |
| 5,254,770 | A | 10/1993 | Olson et al. |
| 6,632,415 | B2 | 10/2003 | Miller et al. |
| 7,119,245 | B1 | 10/2006 | Thoma et al. |
| 8,398,955 | B2 | 3/2013 | Lai et al. |

FOREIGN PATENT DOCUMENTS

| | | |
|---|---|---|
| CN | 103101924 A | 5/2013 |
| CN | 104211080 A | 12/2014 |
| CN | 104671253 A | 6/2015 |
| CN | 105668582 A | 6/2016 |
| EP | 0116203 A1 | 8/1984 |
| WO | 9325475 A1 | 12/1993 |
| WO | 2015021611 A1 | 2/2015 |

OTHER PUBLICATIONS

Derewinski et al., "Effect of Stirring on the Selective Synthesis of MEL or TON Zeolites in the Presence of 1,8-Diaminooctane", Studies in Surface Science and Catalysis, vol. 154, pp. 349-354, 2004.

Hayasaka et al., "Formation of ZSM-22 Zeolite Catalytic Particles by Fusion of Elementary Nanorods" Chem Eur. J., vol. 13, pp. 10070-10077, 2007.

Jamil et al., "Controlling naphtha cracking using nanosized TON zeolite synthesized in the presence of polyoxyethylene surfactant", Journal of Analytical and Applied Pyrolysis, vol. 110, pp. 338-345, 2014.

Jamil et al., "Selective Production of Propylene from Methanol Conversion over Nanosized ZSM-22 Zeolites", Industrial & Engineering Chemistry Research, vol. 53, pp. 19498-19505, 2014.

Jamil et al., "Facil control of nanosized ZSM-22 crystals using dynamic crystallization technique", Microporous and Mlesoporous Materials, vol. 227, pp. 16-22, 2016.

(Continued)

*Primary Examiner* — Elizabeth D Wood
(74) *Attorney, Agent, or Firm* — Dinsmore & Shohl LLP (57) ABSTRACT

According to one or more embodiments, non-agglomerated, nano-sized ZSM-22 zeolites may be synthesized by methods comprising operating a mechanical rotation drum unit at a first temperature of from 40° C. to 60° C. and a first speed of from 200 rpm to 1000 rpm for a first time period of from 1.3 hours to 2.7 hours; operating the mechanical rotation drum unit at a second speed of from 30 rpm to 90 rpm for a second time period of from 0.05 hours to 0.4 hours; heating the mechanical rotation drum unit at a ramping temperature of from 8° C./minute to 12° C./minute to a second temperature of from 115° C. to 185° C. at the second speed; operating the mechanical rotation drum unit at the second temperature and the second speed for a third time period of from 30 hours to 90 hours; and cooling the mechanical rotation drum unit at a fourth speed of 0 rpm.

20 Claims, 5 Drawing Sheets

(56) References Cited

OTHER PUBLICATIONS

Jamil et al., "Microwave-assisted solvothermal synthesis of ZSM-22 zeolite with controllable crystal lengths", Particuology, vol. 24, pp. 138-141, 2016.
Masih et al., "Hydrothermal synthesis of pure ZSM-22 under mild conditions", The Royal Society of Chemistry, Chem Communication, pp. 3303-3305, 2007.
Notification of Transmittal of the International Search Report and the Written Opinion of the International Searching Authority, or the Declaration dated Jul. 15, 2022 pertaining to International application No. PCT/US2022/020327 filed Mar. 15, 2022, pp. 1-16.
Jamil, Anas Karr et al., "The role of alcohols and diols as co-solvents in fabrication of TON zeolite" Journal of Industrial and Engineering Chemistry, vol. 29, Sep. 1, 2015, pp. 112-119.
Feng, Zhaolu et al., "Hydroisomerization of n-decane over the Pd/ZSM-22 bifunctional catalysts: The effects of dynamic and static crystallization to the zeolite" Microporous and Mesoporous Materials, Elsevier, Amsterdam ,NL, vol. 274, Jul. 9, 2018, pp. 1-8.

SYSTEMS AND METHODS FOR THE SYNTHESIZING ZSM-22 ZEOLITES

TECHNICAL FIELD

Embodiments of the present disclosure generally relate to zeolite catalysts and more specifically relate to systems and methods for synthesizing zeolite catalysts.

BACKGROUND

Zeolites are ordered, porous crystalline materials having a definite crystalline structure. Within their crystalline structure, zeolites have cavities interconnected by channels or pores, which accept for adsorption molecules of certain dimensions while rejecting those of dimensions that are too large to be adsorbed through the channels and pores. Accordingly, zeolites have catalytic properties for various types of hydrocarbon conversion and are commonly referred to as "molecular sieves."

Zeolite catalysts have widespread uses in many diverse industries. Exemplary industries include the petrochemical industry in refinery, gas separation, and carbon dioxide separation and capture processes. In the petroleum industry, for example, zeolite catalysts may be included in processes such as fluid catalytic cracking (FCC) and hydrocracking to catalyze reactions such as hydrogenation, dehydrogenation, isomerization, alkylation, and cracking, for example.

SUMMARY

One type of zeolite, referred to as "ZSM-22," is a orthorhombic high-silica zeolite having a framework that consists of 5-, 6-, and 10-rings. Typically, conventional ZSM-22 zeolites have an agglomerated morphology and micro-scale particle sizes. For example, conventional ZSM-22 zeolites may have crystal sizes (crystal length) in the range of 1 micrometers to 20 micrometers.

When utilized as catalysts, the properties of conventional ZSM-22 zeolites (such as the agglomerated morphology and relatively large particle size) may limit the diffusion of reactants into the material. Another issue can arise when zeolites are used as catalysts for hydrocarbon cracking, because the ZSM-22 catalyst may rapidly deactivate as coke is deposited on the catalyst. However, reducing the crystal size of the ZSM-22 zeolites may improve their catalytic activity, for example, by shortening the reaction diffusional length and by increasing the amount of mesoporous poremouth openings. Shortening the diffusional length may allow for more contact between hydrocarbon molecules and the acidic pores sites of the zeolite, which promotes the primary cracking reaction and reduces the possibility of hydrocarbon agglomeration, thereby minimizing the production of coke. Accordingly, because diffusion is an important parameter for cracking and reaction performance, there are needs for ZSM-22 zeolite catalysts that allow for improved diffusion, for example, by reducing the crystal size of ZSM-22 zeolites.

Embodiments of the present disclosure meet those needs by providing systems and methods of synthesizing ZSM-22 zeolites that utilize a mechanical rotation drum unit, which may produce non-agglomerated, nano-sized ZSM-22 zeolite. The mechanical rotation drum unit may operate at five stages to provide improved control over crystal growth during synthesis of the ZSM-22 zeolites. The presently-disclosed systems and methods may therefore allow for the production of ZSM-22 zeolites with relatively smaller and more uniform crystals, both in terms of length and width, in comparison to conventional ZSM-22 zeolites. Additionally, in embodiments, the non-agglomerated, nano-sized ZSM-22 zeolites may allow for a shorter diffusion length thereby improving the catalytic activity of the ZSM-22 zeolites.

According to one or more embodiments presently disclosed, methods of synthesizing a non-agglomerated, nano-sized ZSM-22 zeolite may include passing a silica solution and an aluminate solution into a mechanical rotation drum unit; operating the mechanical rotation drum unit at a first temperature of from 40° C. to 60° C. and a first speed of from 200 rpm to 1000 rpm for a first time period of from 1.3 hours to 2.7 hours; operating the mechanical rotation drum unit at a second speed of from 30 rpm to 90 rpm for a second time period of from 0.05 hours to 0.4 hours; heating the mechanical rotation drum unit at a ramping temperature of from 8° C./minute to 12° C./minute to a second temperature of from 115° C. to 185° C. at the second speed of from 30 rpm to 90 rpm; operating the mechanical rotation drum unit at the second temperature of from 115° C. to 185° C. and the second speed of from 30 rpm to 90 rpm for a third time period of from 30 hours to 90 hours; and cooling the mechanical rotation drum unit at a fourth speed of 0 rpm to produce the non-agglomerated, nano-sized ZSM-22 zeolite.

According to one or more embodiments presently disclosed, methods of synthesizing a non-agglomerated, nano-sized ZSM-22 zeolite may include passing a silica solution and an aluminate solution into a mechanical rotation drum unit; and operating the mechanical rotation drum unit at five stages to produce the non-agglomerated, nano-sized ZSM-22 zeolite. The first stage may operate at a first mixing speed of from 200 rpm to 1000 rpm and at a first time period of from 1.3 hours to 2.7 hours; the second stage may operate at a second mixing speed of from 30 rpm to 90 rpm and at a second time period of from 0.05 hours to 0.4 hours; the third stage may operate at a third mixing speed of from 30 rpm to 90 rpm and at a third time period of from 0.05 hours to 0.4 hours; the fourth stage may operate at a fourth mixing speed of from 30 rpm to 90 rpm and at a first time period of from 30 hours to 90 hours; and the fifth stage may operate at a fifth mixing speed of 0 rpm.

According to one or more embodiments presently disclosed, a system for synthesizing a non-agglomerated, nano-sized ZSM-22 zeolite may include a mechanical rotation drum unit in communication with a feed comprising a silica solution and an aluminate solution, the mechanical rotation drum unit configured to operate at five stages to produce the non-agglomerated, nano-sized ZSM-22 zeolite. The first stage may operate at a first mixing speed of from 200 rpm to 1000 rpm and at a first time period of from 1.3 hours to 2.7 hours; the second stage may operate at a second mixing speed of from 30 rpm to 90 rpm and at a second time period of from 0.05 hours to 0.4 hours; the third stage may operate at a third mixing speed of from 30 rpm to 90 rpm and at a third time period of from 0.05 hours to 0.4 hours; the fourth stage may operate at a fourth mixing speed of from 30 rpm to 90 rpm and at a first time period of from 30 hours to 90 hours; and the fifth stage may operate at a fifth mixing speed of 0 rpm.

These and other features, aspects, and advantages of the present disclosure will become better understood with reference to the following description and the appended claims. Additional features and advantages of the embodiments presently described will be set forth in the detailed description which follows, and in part will be readily apparent to those skilled in the art from that description or recognized by practicing the embodiments presently described, including the detailed description which follows, the claims, as well as the appended drawings.

DETAILED DESCRIPTION

As used in this disclosure, a "catalyst system" refers to materials which are catalytically active and may comprise a support material and one or more catalytically active materials, sometimes referred to as "the catalyst."

As used in this disclosure, a "reactor" refers to one or more vessels in which one or more chemical reactions may occur between one or more reactants optionally in the presence of one or more catalysts. For example, a reactor may include a tank or tubular reactor configured to operate as a batch reactor, a continuous stirred-tank reactor (CSTR), a plug flow reactor, which will be subsequently described in more detail. Example reactors include packed bed reactors such as fixed bed reactors, and fluidized bed reactors.

Presently described are systems and methods of synthesizing ZSM-22 zeolites. The disclosed systems and methods may synthesize ZSM-22 zeolites that can be utilized as catalysts and catalyst supports in, for example, hydrocarbon conversion in refining and petrochemical applications. The ZSM-22 zeolites synthesized by the disclosed systems and methods may be non-agglomerated, nano-sized ZSM-22 zeolites.

As stated previously in this disclosure, ZSM-22 is an orthorhombic high-silica zeolite having a framework that consists of 5-, 6-, and 10-rings, where "high-silica" means a composition for which the silica/alumina ratio is greater than 5.

In embodiments, the ZSM-22 zeolites may include crystals that have a uniform and seed-like shape.

As used in the present disclosure, "agglomerated" means a mass or assemblage of crystals as observed by a scanning electron microscope (SEM) image, where at least 50% of the observed crystals are assembled together as a mass. Conventional ZSM-22 catalysts generally comprise an agglomerated morphology that includes micro-scale crystal. The agglomerated, micro-scale particle sizes may limit the diffusion of reactants into the zeolite catalysts.

Accordingly, non-agglomerated ZSM-22 catalysts may allow for improved diffusion, which may allow for improved cracking and reaction performance.

In embodiments, the crystal sizes of the ZSM-22 zeolites may be nano-scale. As used in the present disclosure, "nano-scale," means structures with a length scale applicable from 1 nanometer (nm) to less than one micrometer (μm). In embodiments, the presently-disclosed non-agglomerated, nanoscale ZSM-22 zeolites may include crystal sizes having a length within a range of from 100 nm to 400 nm and having a width within a range of from 50 nm to 250. In further embodiments, the length of the crystals of the ZSM-22 zeolites may be from 100 nm to 350 nm, from 100 nm to 300 nm, from 100 nm to 250 nm, from 100 nm to 200 nm, from 200 nm to 400 nm, from 200 nm to 350 nm, from 200 nm to 300 nm, from 200 nm to 250 nm, from 250 nm to 400 nm, from 250 nm to 350 nm, from 250 nm to 300 nm, from 300 nm to 400 nm, from 300 nm to 350 nm, or from 350 nm to 400 nm. In further embodiments, the width of the crystals of the ZSM-22 zeolites may be from 50 nm to 200 nm, from 50 nm to 150 nm, from 50 nm to 100 nm, from 100 nm to 250 nm, from 100 nm to 200 nm, or from 200 nm to 250 nm. In some embodiments, the crystals of the ZSM-22 zeolites may have a length within a range of from 100 nm to 200 nm and a width within a range of from 50 nm to 100 nm. In some embodiments, the crystals of the ZSM-22 zeolites may have a length within a range of from 150 nm to 400 nm and a width within a range of from 100 nm to 250 nm.

The ZSM-22 zeolites may have a silica/alumina molar ratio within a range of from 25 and 100, from 25 to 75, from 25 to 50, from 50 to 100, from 50 to 75, or from 75 to 100. In embodiments, if the silica/alumina ratio is 50 or less, the ZSM-22 zeolite produced may have a crystal size with a length in a range of from 100 nm 200 nm and a width in a range of from 50 nm to 100 nm. In embodiments, if the silica/alumina molar ratio is greater than 50, the ZSM-22 zeolite produced may have a crystal size with a length in a range of from 150 nm to 400 nm and a width in a range of from 100 nm to 250 nm. Without being bound by theory, the silica/alumina ratio may have a direct effect on producing the nano-scale zeolite crystals of the present disclosure.

The ZSM-22 may have a porosity defined in part by the micropore and mesopore volumes that represent the specific volumes corresponding to the microporous structure and to the mesoporous structure, respectively. The mesopores are mainly due to intercrystalline voids formed, because of the very small size of the zeolite crystals. The pore size ranges for mesopores and micropores are in conformity with conventionally understood size ranges for such pore classifications with micropores representing pores under 2 nanometers (nm) in diameter and mesopores representing pores of 2 to 50 nm in diameter. A total pore volume would additionally include any macropores if present. Regarding the ZSM-22 porosity, the ZSM-22 may have a micropore volume ($V_{micro}$) of at least 0.05 cubic centimeters per gram (cm$^3$/g), or a micropore volume of at least 0.10 cm$^3$/g, a micropore volume of 0.05 to 0.25 cm$^3$/g, or a micropore volume of 0.10 to 0.20 cm$^3$/g in accordance with the t-plot method of determining micropore volume. Similarly, in one or more embodiments, the ZSM-22 may have a mesopore volume ($V_{meso}$) of at least 0.01 cubic centimeters per gram (cm$^3$/g), or a mesopore volume of at least 0.03 cm$^3$/g, a mesopore volume of 0.01 to 0.10 cm$^3$/g, a mesopore volume of 0.03 to 0.08 cm$^3$/g calculated according to the Barrett-Joiner-Halenda (BJH) method of determining mesopore volume.

In one or more embodiments, the ZSM-22 may have a surface area defined by a Brunauer-Emmett-Teller (BET) analysis ($S_{BET}$) of less than 200 square meters per gram (m$^2$/g), a $S_{BET}$ surface area of less than 190 m$^2$/g, or a $S_{BET}$ surface area of less than 180 m$^2$/g. Further, the ZSM-22 may have a micropore surface area ($S_{micro}$) of 100 m$^2$/g to 200 m$^2$/g.

Embodiments of systems and methods of synthesizing ZSM-22 zeolites will now be described. The disclosed systems and methods may allow for the synthesis of non-agglomerated ZSM-22 zeolites, nano-sized ZSM-22 zeolites, and ZSM-22 zeolites that may be both non-agglomerated and nano-sized. As will be described subsequently in more detail, embodiments of the presently-disclosed systems include a mechanical rotation drum unit.

Figure 1:
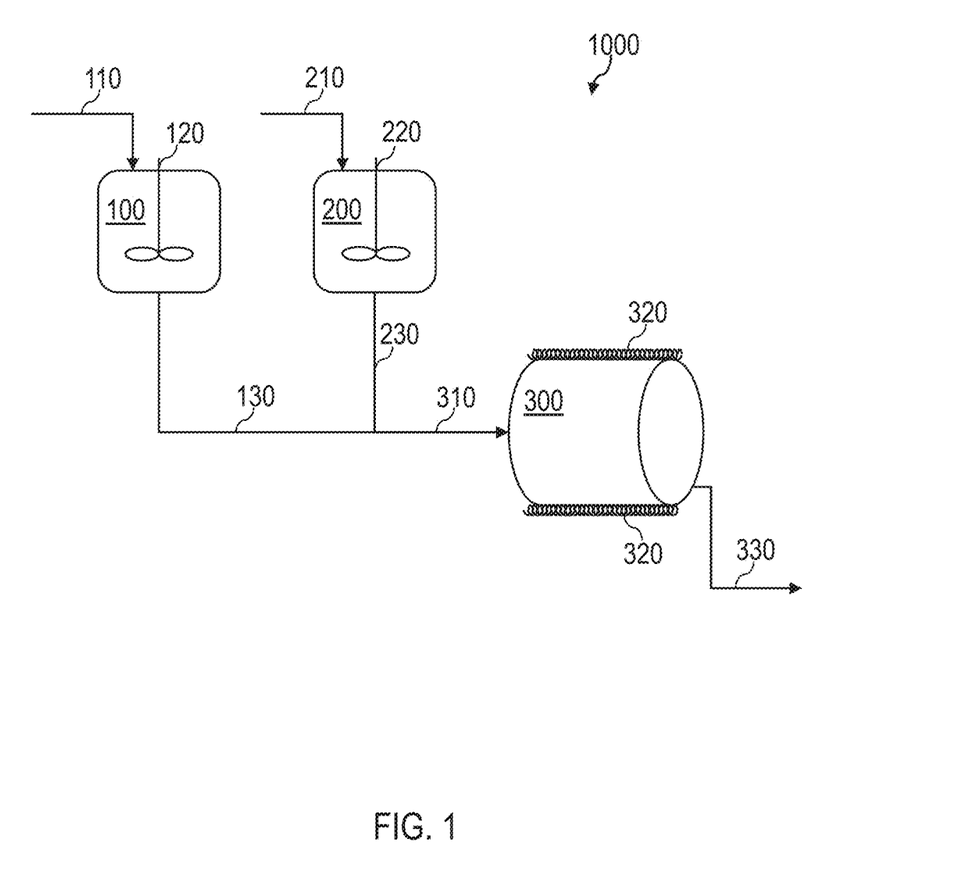
FIG. 1 is a schematic depiction of a system for producing ZSM-22 with horizontal heating coils in accordance with one or more embodiments.
Figure 2:
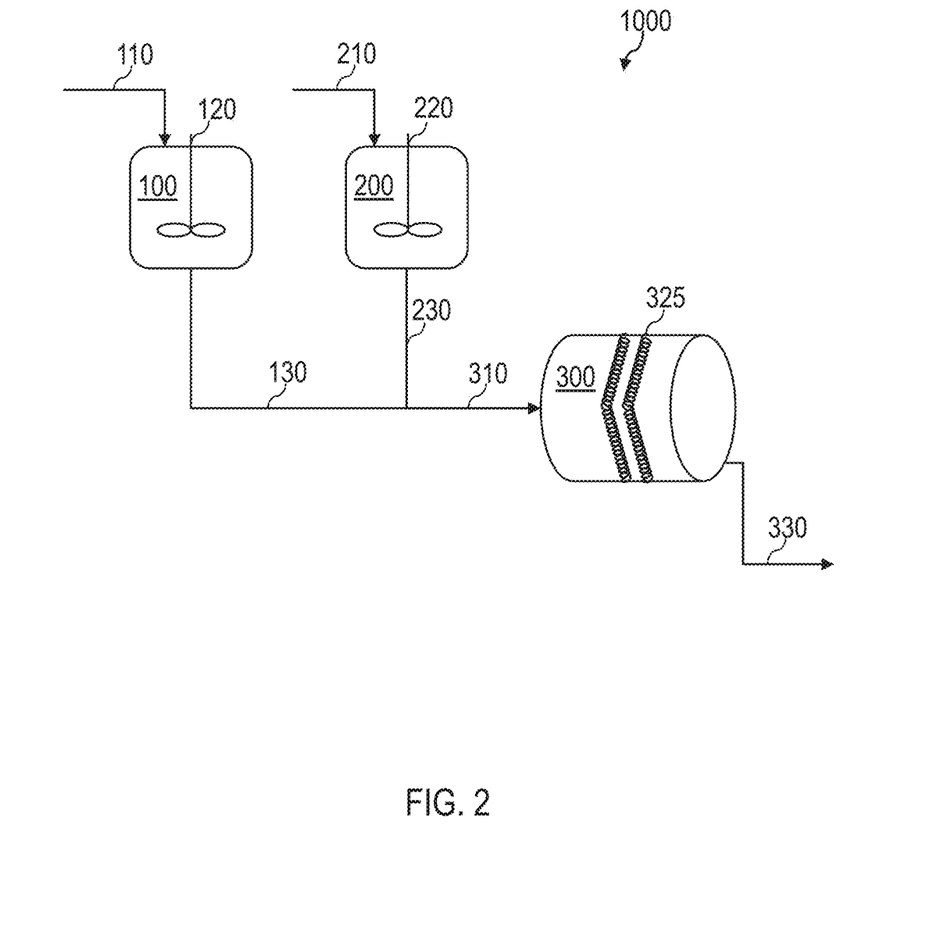
FIG. 2 is a schematic depiction of a system for producing ZSM-22 with vertical heating coils in accordance with one or more embodiments.

Referring now to FIGS. 1 and 2, an embodiment of a system 1000 for synthesizing a ZSM-22 zeolite is schematically depicted. As shown in FIG. 1, the system 1000 generally includes an aluminate unit 100, a silicate unit 200, and a mechanical rotation drum unit 300. In embodiments, a "unit" may include one or more vessels connected in series in which one or more chemical reactions may occur between one or more reactants optionally in the presence of one or more catalysts. For example, the one or more vessels may include a tank or tubular reactor configured to operate as a batch reactor, a continuous stirred-tank reactor (CSTR), or a plug flow reactor. Example reactors include packed bed reactors such as fixed bed reactors, and fluidized bed reactors.

As shown in FIG. 1, embodiments of the system 1000 for synthesizing a ZSM-22 zeolite may include passing a first feed via a line 110 to the aluminate unit 100 to produce an aluminate solution 130, passing a silicate feed via a line 210 to the silicate unit 200 to produce a silicate solution 230, combining the aluminate solution 130 and the silicate solution 230 to produce a combined feed 310, passing the combined feed 310 to the mechanical rotation drum unit 300, operating the mechanical rotation drum unit 300 as subsequently described to produce a stream 330 comprising non-agglomerated, nano-sized ZSM-22 zeolite.

Referring still to FIGS. 1 and 2, the first feed may be passed to the aluminate unit 100 via line 110. The first feed may include an aluminum source in solution. The aluminum source may include one or more of aluminum hydroxide, aluminum nitrate, aluminum sulfate octadecahydrate, sodium aluminate, and aluminum chloride.

In further embodiments, the aluminum source may be mixed with deionized water. In an exemplary embodiment, the solution of aluminum sulfate octadecahydrate and deionized water making up the first feed may include from 0.5 weight percent (wt. %) to 10 wt. % aluminum sulfate octadecahydrate based on the total weight of the solution. In embodiments, the first feed may include from 0.5 wt. % to 10 wt. %, from 0.5 wt. % to 8.0 wt. %, from 0.5 wt. % to 6.0 wt. %, from 0.5 wt. % to 4.0 wt. %, from 0.5 wt. % to 2.0 wt. %, from 0.5 wt. % to 1.0 wt. %, from 1.0 wt. % to 10 wt. %, from 1.0 wt. % to 8.0 wt. %, from 1.0 wt. % to 6.0 wt. %, from 1.0 wt. % to 4.0 wt. %, from 1.0 wt. % to 2.0 wt. %, from 2.0 wt. % to 10 wt. %, from 2.0 wt. % to 8.0 wt. %, from 2.0 wt. % to 6.0 wt. %, from 2.0 wt. % to 4.0 wt. %, from 4.0 wt. % to 10 wt. %, from 4.0 wt. % to 8.0 wt. %, from 4.0 wt. % to 6.0 wt. %, from 6.0 wt. % to 10 wt. %, from 6.0 wt. % to 8.0 wt. %, from 8.0 wt. % to 10 wt. % aluminum sulfate octadecahydrate based on the total weight of the solution.

The aluminate unit 100 may operate at a temperature suitable to produce the aluminate solution. In embodiments, the aluminate unit 100 may operate at a temperature from 15° C. to 35° C., from 15° C. to 30° C., from 15° C. to 25° C., from 15° C. to 20° C., from 20° C. to 35° C., from 20° C. to 30° C., from 20° C. to 25° C., from 25° C. to 35° C., from 25° C. to 30° C., or from 30° C. to 35° C.

The aluminate unit 100 may include a stirrer 120. Once the first feed has been added, the aluminate unit 100 may be stirred at a speed of from 300 rpm to 550 rpm, from 300 rpm to 500 rpm, from 300 rpm to 450 rpm, from 300 rpm to 400 rpm, from 300 rpm to 380 rpm, from 300 rpm to 360 rpm, from 300 rpm to 340 rpm, from 300 rpm to 320 rpm, from 320 rpm to 400 rpm, from 320 rpm to 380 rpm, from 320 rpm to 360 rpm, from 320 rpm to 340 rpm, from 340 rpm to 400 rpm, from 340 rpm to 380 rpm, from 340 rpm to 360 rpm, from 360 rpm to 400 rpm, from 360 rpm to 380 rpm, from 380 rpm to 400 rpm. The solution may be stirred in the aluminate unit 100 for from 10 minutes to 15 minutes, from 10 minutes to 14 minutes, from 10 minutes to 13 minutes, from 10 minutes to 12 minutes, from 10 minutes to 11 minutes, from 11 minutes to 15 minutes, from 11 minutes to 14 minutes, from 11 minutes to 13 minutes, from 11 minutes to 12 minutes, from 12 minutes to 15 minutes, from 12 minutes to 14 minutes, from 12 minutes to 13 minutes, from 13 minutes to 15 minutes, from 13 minutes to 14 minutes, or from 14 minutes to 15 minutes.

A second feed comprising a structure directing agent may be injected via line 110 into the aluminate unit 100 where it is mixed with the first feed. The structure directing agent may be an organic nitrogen-containing structure directing agent. The organic nitrogen-containing compound may be an amine, such as diethylamine or 1,6-diaminohexane, an alkanolamine, such as diethanolamine, 1,8-diamino-octane, N-Ethylpyridine, or a tetraalkyl ammonium compound, such as tetrapropylammonium hydroxide (TPAOH). For example, the structure directing agent may be a quaternary cation such as tetrapropylammonium hydroxide. The structure directing agent is not particularly limited in composition, but serves to aid in the formation of the microporous, zeolitic structure of the ZSM-22 zeolite. The structure directing agent may include, one or more of the above compositions introduced via line 110. In embodiments, the second feed may include from 5 wt. % to 20 wt. %, from 5 wt. % to 15 wt. %, from 5 wt. % to 10 wt. %, from 10 wt. % to 20 wt. %, from 10 wt. % to 15 wt. %, from 15 wt. % to 20 wt. % of the structure directing agent based on the total weight of the first feed and the second feed combined.

Once the second feed has been added, the aluminate unit 100 may be stirred at a speed of 200 rpm to 1000 rpm, from 200 rpm to 800 rpm, from 200 rpm to 600 rpm, from 200 rpm to 400 rpm, from 400 rpm to 1000 rpm, from 400 rpm to 800 rpm, from 400 rpm to 600 rpm, from 600 rpm to 1000 rpm, from 600 rpm to 800 rpm, or from 800 rpm to 1000 rpm. The solution may be stirred in the aluminate unit 100 for from 15 minutes to 30 minutes, from 15 minutes to 20 minutes, from 20 minutes to 30 minutes, from 20 minutes to 28 minutes, from 20 minutes to 26 minutes, from 20 minutes to 24 minutes, from 20 minutes to 22 minutes, from 22 minutes to 30 minutes, from 22 minutes to 28 minutes, from 22 minutes to 26 minutes, from 22 minutes to 24 minutes, from 24 minutes to 30 minutes, from 24 minutes to 28 minutes, from 24 minutes to 26 minutes, from 26 minutes to 30 minutes, from 26 minutes to 28 minutes, or from 28 minutes to 30 minutes.

A third feed may be injected into the aluminate unit 100 where it is mixed with the first feed and the second feed to produce an aluminate solution. The third feed may include 4 kg of a mineralizing agent, which may be an alkali hydroxide. In embodiments, the mineralizing agent may be sodium hydroxide or potassium hydroxide. In embodiments, from 0.5 wt. % to 10 wt. %, from 0.5 wt. % to 8.0 wt. %, from 0.5 wt. % to 6.0 wt. %, from 0.5 wt. % to 4.0 wt. %, from 0.5 wt. % to 2.0 wt. %, from 0.5 wt. % to 1.0 wt. %, from 1.0 wt. % to 10 wt. %, from 1.0 wt. % to 8.0 wt. %, from 1.0 wt. % to 6.0 wt. %, from 1.0 wt. % to 4.0 wt. %, from 1.0 wt. % to 2.0 wt. %, from 2.0 wt. % to 10 wt. %, from 2.0 wt. % to 8.0 wt. %, from 2.0 wt. % to 6.0 wt. %, from 2.0 wt. % to 4.0 wt. %, from 4.0 wt. % to 10 wt. %, from 4.0 wt. % to 8.0 wt. %, from 4.0 wt. % to 6.0 wt. %, from 6.0 wt. % to 10 wt. %, from 6.0 wt. % to 8.0 wt. %, from 8.0 wt. % to 10 wt. % of the mineralizing agent may be added, based on the total weight of the first feed, the second feed, and the third feed, combined.

Once the third feed has been added, the aluminate unit may be stirred at a speed of 200 rpm to 1000 rpm, from 200 rpm to 800 rpm, from 200 rpm to 600 rpm, from 200 rpm to 400 rpm, from 400 rpm to 1000 rpm, from 400 rpm to 800 rpm, from 400 rpm to 600 rpm, from 600 rpm to 1000 rpm, from 600 rpm to 800 rpm, or from 800 rpm to 1000 rpm. The solution may be stirred in the aluminate unit 100 for from 10 minutes to 20 minutes, from 10 minutes to 18 minutes, from 10 minutes to 16 minutes, from 10 minutes to 14 minutes, from 10 minutes to 12 minutes, from 12 minutes to 20 minutes, from 12 minutes to 18 minutes, from 12 minutes to 16 minutes, from 12 minutes to 14 minutes, from 14 minutes to 20 minutes, from 14 minutes to 18 minutes, from 14 minutes to 16 minutes, from 16 minutes to 20 minutes, from 16 minutes to 18 minutes, or from 18 minutes to 20 minutes.

Once the aluminate unit has been stirred, an aluminate solution may then be discharged via line 130 where it is subsequently combined with the silicate solution from line 230 to produce a combined feed that is passed via line 310 to the mechanical rotation drum unit 300.

Referring still to FIG. 1, a silicate feed may be passed via line 210 to the silicate unit 200 to produce a silicate solution 230. The silicate feed may include a solution that includes a silica source. The silica source may include one or more of a silica colloidal solution, fume silica, and silica gel. In embodiments, the solution may include a silica source mixed with deionized water. In embodiments, the silica source may be colloidal silica. The silicate feed may include from 10 wt. % to 25 wt. %, from 10 wt. % to 20 wt. %, from 10 wt. % to 15 wt. %, from 15 wt. % to 25 wt. %, from 15 wt. % to 20 wt. %, or from 20 wt. % to 25 wt. % of the silica source based on the total weight of the solution. The silicate feed may include from 75 wt. % to 90 wt. %, from 75 wt. % to 85 wt. %, from 75 wt. % to 80 wt. %, from 80 wt. % to 90 wt. %, from 80 wt. % to 85 wt. %, or from 85 wt. % to 90 wt. % of water based on the total weight of the solution.

The silicate unit 200 may operate at a temperature suitable to produce the silicate solution. In embodiments, the silicate unit 200 may operate at a temperature from 15° C. to 35° C., from 15° C. to 30° C., from 15° C. to 25° C., from 15° C. to 20° C., from 20° C. to 35° C., from 20° C. to 30° C., from 20° C. to 25° C., from 25° C. to 35° C., from 25° C. to 30° C., or from 30° C. to 35° C.

Once the fourth feed has been added, the silicate unit 200 may be stirred at a speed of 200 rpm to 1000 rpm, from 200 rpm to 800 rpm, from 200 rpm to 600 rpm, from 200 rpm to 400 rpm, from 400 rpm to 1000 rpm, from 400 rpm to 800 rpm, from 400 rpm to 600 rpm, from 600 rpm to 1000 rpm, from 600 rpm to 800 rpm, or from 800 rpm to 1000 rpm. The solution may be stirred in the silicate unit 200 for from 15 minutes to 30 minutes, from 15 minutes to 20 minutes, from 20 minutes to 30 minutes, from 20 minutes to 28 minutes, from 20 minutes to 26 minutes, from 20 minutes to 24 minutes, from 20 minutes to 22 minutes, from 22 minutes to 30 minutes, from 22 minutes to 28 minutes, from 22 minutes to 26 minutes, from 22 minutes to 24 minutes, from 24 minutes to 30 minutes, from 24 minutes to 28 minutes, from 24 minutes to 26 minutes, from 26 minutes to 30 minutes, from 26 minutes to 28 minutes, or from 28 minutes to 30 minutes.

Once the aluminate unit has been stirred, a silicate solution may then be discharged via line 230 where it is subsequently combined with the aluminate solution from line 130 to produce a combined feed that is passed via line 310 to the mechanical rotation drum unit 300.

The mechanical rotation drum unit 300 may be a vessel that includes a polymeric coating. The polymeric coating may be any compatible plastic having a Relative Temperature Index (RTI) of greater than 190° C.

For example, the polymeric coating may include one or more of Teflon, polyetheretherketones (PEEK), polyphenylene sulfide, polyphenylsulfone (PPS), and polyetherimide (PEI). The polymeric coating of the mechanical rotation drum unit 300 allows for the mechanical rotation drum unit 300 to tolerate the heating applied during one or more stages of the presently-described methods of synthesizing the non-agglomerated, nano-sized ZSM-22 zeolites.

The mechanical rotation drum unit 300 may further include a heating element e.g., a heating coil, which is configured to provide heat to the mechanical rotation drum unit 300. The heating coil may be configured around the vessel in a manner sufficient to heat the mechanical rotation drum unit 300. Referring now to FIGS. 1-2, for example, the heating coil may be configured horizontally, as shown in FIG. 1, or vertically, as shown in FIG. 2, around the mechanical rotation drum unit 300. Other configurations beyond those depicted in FIGS. 1-2 are contemplated. The mechanical rotation drum unit 300 may alternatively or additionally include other heating elements (not shown) to provide the proper and controlled heating required for the ZSM-22 zeolite preparation. In embodiments, the mechanical rotation drum unit 300 may further include a thermocouple embedded into the vessel, which may be used to measure the temperature inside the mechanical rotation drum unit 300. In embodiments, the heating coil or other heating elements may be exposed (as shown in FIGS. 1-2), or, alternatively, they may be covered by thermal insulator (not shown). In such embodiments, the thermal insulator may be included for safety, to maintain constant heating to the unit, or both.

In embodiments, the mechanical rotation drum unit 300 may be operated at five stages to produce the non-agglomerated, nano-sized ZSM-22 zeolites of the present disclosure.

The mechanical rotation drum unit 300 may be first operated at a first stage, which is set at a mixing speed, mixing time, and temperature sufficient to mix the aluminate solution with the silicate solution to produce a zeolite gel solution. During the first stage the mechanical rotation drum unit 300 may be operated at a first mixing speed of from 200 rpm to 1000 rpm, from 200 rpm to 800 rpm, from 200 rpm to 600 rpm, from 200 rpm to 400 rpm, from 400 rpm to 1000 rpm, from 400 rpm to 800 rpm, from 400 rpm to 600 rpm, from 600 rpm to 1000 rpm, from 600 rpm to 800 rpm, or from 800 rpm to 1000 rpm and at a first time period of from 1.3 hours to 2.7 hours, from 1.3 hours to 2.5 hours, from 1.3 hours to 2.3 hours, from 1.3 hours to 2.0 hours, from 1.3 hours to 1.7 hours, from 1.3 hours to 1.5 hours, from 1.5 hours to 2.7 hours, from 1.5 hours to 2.5 hours, from 1.5 hours to 2.3 hours, from 1.5 hours to 2.0 hours, from 1.5 hours to 1.7 hours, from 1.7 hours to 2.7 hours, from 1.7 hours to 2.5 hours, from 1.7 hours to 2.3 hours, from 1.7 hours to 2.0 hours, from 2.0 hours to 2.7 hours, from 2.0 hours to 2.5 hours, from 2.0 hours to 2.3 hours, from 2.3 hours to 2.7 hours, from 2.3 hours to 2.5 hours, or from 2.5 hours to 2.7 hours. In the first stage, the mechanical rotation drum unit 300 may be operated at a temperature of from 40°

C. to 60° C., from 40° C. to 55° C., from 40° C. to 50° C., from 40° C. to 45° C., from 45° C. to 60° C., from 45° C. to 55° C., from 45° C. to 50° C., from 50° C. to 60° C., from 50° C. to 55° C., or from 55° C. to 60° C. Without being bound by theory, the mixing speed within the range of from 200 rpm to 1000 rpm may allow for the aluminate solution to become sufficiently mixed within the silicate solution. Without being bound by theory, the mixing speed, mixing time, and temperature of the mechanical rotation drum unit 300 may impact crystal growth by affecting the nucleation formation and the crystallization rate of the zeolite.

The mechanical rotation drum unit 300 may then be operated at a second stage, which is set at a mixing speed, mixing time, and temperature sufficient to allow for rapid aging and nano-crystallization (pre-crystallization) of the zeolite gel solution. Without being bound by theory, the second provides an aging period that may serve to produce nuclei for crystallization and may reduce the crystallization time. During the second stage, the mechanical rotation drum unit 300 may be operated at a second mixing speed of from 30 rpm to 90 rpm, for 30 rpm to 30 rpm to 75 rpm, from 30 rpm to 50 rpm, from 50 rpm to 90 rpm, from 50 rpm to 75 rpm, or from 75 rpm to 90 rpm and at a second time period of from 0.05 hours to 0.4 hours, from 0.05 hours to 0.3 hours, from 0.05 hours to 0.2 hours, from 0.05 hours to 0.1 hours, from 0.1 hours to 0.4 hours, from 0.1 hours to 0.3 hours, from 0.1 hours to 0.2 hours, from 0.2 hours to 0.4 hours, from 0.2 hours to 0.3 hours, or from 0.3 hours to 0.4 hours. In the second stage, the mechanical rotation drum unit 300 may be operated at a temperature of from 20° C. to 60° C., from 20° C. to 50° C., from 20° C. to 40° C., or from 20° C. to 30° C. In other embodiments, in the second stage, the mechanical rotation drum unit 300 may be operated at a temperature of from 40° C. to 60° C., from 40° C. to 55° C., from 40° C. to 50° C., from 40° C. to 45° C., from 45° C. to 60° C., from 45° C. to 55° C., from 45° C. to 50° C., from 50° C. to 60° C., from 50° C. to 55° C., or from 55° C. to 60° C.

The mechanical rotation drum unit 300 may then be operated at a third stage, which may help to prevent accumulation of the nutrients and limitation of nutrients in terms of mass transfer. Without being bound by theory, the rotation of the mechanical rotation drum unit 300 may correspondingly reduce synthesis time and allow for the production of smaller and more uniform zeolite crystals. During the third stage, the temperature of the mechanical rotation drum unit 300 may be increased at a ramping temperature of from 8° C./minute to 12° C./minute, from 8° C./minute to 10° C./minute, or from 10° C./minute to 12° C./minute. During the third stage, the mechanical rotation drum unit 300 may be operated at a third mixing speed of from 30 rpm to 90 rpm, for 30 rpm to 30 rpm to 75 rpm, from 30 rpm to 50 rpm, from 50 rpm to 90 rpm, from 50 rpm to 75 rpm, or from 75 rpm to 90 rpm and at a third time period of from 0.05 hours to 0.4 hours, from 0.05 hours to 0.3 hours, from 0.05 hours to 0.2 hours, from 0.05 hours to 0.1 hours, from 0.1 hours to 0.4 hours, from 0.1 hours to 0.3 hours, from 0.1 hours to 0.2 hours, from 0.2 hours to 0.4 hours, from 0.2 hours to 0.3 hours, or from 0.3 hours to 0.4 hours. In the third stage, the mechanical rotation drum unit 300 may be operated at a temperature of from 115° C. to 185° C., from 115° C. to 175° C., from 115° C. to 165° C., from 115° C. to 155° C., from 115° C. to 145° C., from 115° C. to 135° C., from 115° C. to 125° C., from 125° C. to 185° C., from 125° C. to 175° C., from 125° C. to 165° C., from 125° C. to 155° C., from 125° C. to 145° C., from 125° C. to 135° C., from 135° C. to 185° C., from 135° C. to 175° C., from 135° C. to 165° C., from 135° C. to 155° C., from 135° C. to 145° C., from 145° C. to 185° C., from 145° C. to 175° C., from 145° C. to 165° C., from 145° C. to 155° C., from 155° C. to 185° C., from 155° C. to 175° C., from 155° C. to 165° C., from 165° C. to 185° C., from 165° C. to 175° C., or from 175° C. to 185° C.

The mechanical rotation drum unit 300 may then be operated at a fourth stage, which is set at a mixing speed, mixing time, and temperature sufficient to reduce the production of crystobalite, a dense silica. The rotation of the mechanical rotation drum unit 300 in the fourth stage may help to prevent accumulation of the nutrients. Without being bound by theory, the rotation of the mechanical rotation drum unit 300 in the fourth stage may correspondingly reduce synthesis time and allow for the production of smaller and more uniform zeolite crystals. During the fourth stage, the mechanical rotation drum unit 300 may be operated at a fourth mixing speed of from 30 rpm to 90 rpm, for 30 rpm to 30 rpm to 75 rpm, from 30 rpm to 50 rpm, from 50 rpm to 90 rpm, from 50 rpm to 75 rpm, or from 75 rpm to 90 rpm and at a fourth time period of from 30 hours to 90 hours, from 30 hours to 70 hours, from 30 hours to 50 hours, from 50 hours to 90 hours, from 50 hours to 70 hours, or from 70 hours to 90 hours. In the fourth stage, the mechanical rotation drum unit 300 may be operated at a temperature of from 115° C. to 185° C., from 115° C. to 175° C., from 115° C. to 165° C., from 115° C. to 155° C., from 115° C. to 145° C., from 115° C. to 135° C., from 115° C. to 125° C., from 125° C. to 185° C., from 125° C. to 175° C., from 125° C. to 165° C., from 125° C. to 155° C., from 125° C. to 145° C., from 125° C. to 135° C., from 135° C. to 185° C., from 135° C. to 175° C., from 135° C. to 165° C., from 135° C. to 155° C., from 135° C. to 145° C., from 145° C. to 185° C., from 145° C. to 175° C., from 145° C. to 165° C., from 145° C. to 155° C., from 155° C. to 185° C., from 155° C. to 175° C., from 155° C. to 165° C., from 165° C. to 185° C., from 165° C. to 175° C., or from 175° C. to 185° C.

The mechanical rotation drum unit 300 may be operated at a fifth stage in which the heating element and drum rotation are both stopped. Without being bound by theory the fifth stage may allow for uniform transport phenomena. Thus, in embodiments, during the fifth stage, the mechanical rotation drum unit 300 may be operated at a fifth mixing speed of 0 rpm and at a time sufficient to cool the contents of the mechanical rotation drum unit 300 to a temperature of from 20° C. to 50° C., from 20° C. to 40° C., from 20° C. to 30° C., from 30° C. to 50° C., from 30° C. to 40° C., or from 30° C. to 50° C.

In embodiments, once the mechanical rotation drum unit 300 has been operated at the five stages to produce the non-agglomerated, nano-sized ZSM-22 zeolites, the zeolites may undergo one or more subsequent treatment steps. In embodiments, the mechanical rotation drum unit 300 may produce the non-agglomerated, nano-sized ZSM-22 zeolite in powder form, which may need to be separated from the solution in the mechanical rotation drum unit 300. In such embodiments, the effluent of the mechanical rotation drum unit 300, which includes the non-agglomerated, nano-sized ZSM-22 zeolite and the solution may be treated by using a batch or continuous centrifuge unit at a speed in a range of from 1000 rpm to 4000 rpm, from 1000 rpm to 3000 rpm, from 1000 rpm to 2000 rpm, from 2000 rpm to 4000 rpm, from 2000 rpm to 3000 rpm, or from 3000 rpm to 4000 rpm for period of from 10 minutes to 20 minutes, from 10 minutes to 15 minutes to 20 minutes, or from 15 minutes to 20 minutes to remove the solution from the non-agglomerated, nano-sized ZSM-22 zeolite powder.

Once separated from the solution, the non-agglomerated, nano-sized ZSM-22 zeolite powder may then be washed with water one or more times, for example from 1 to 4 times, to remove to wash remaining alkali hydroxide from the non-agglomerated, nano-sized ZSM-22 zeolite powder. A centrifuge may then be utilized to separate the water phase from the washed non-agglomerated, nano-sized ZSM-22 zeolite powder.

Embodiments may include one or more drying steps, which may be performed under air at a temperature of from 90° C. to 110° C., from 90° C. to 100° C., or from 100° C. to 110° C. for a time period of from 10 hours to 20 hours, from 10 hours to 18 hours, from 10 hours to 16 hours, from 10 hours to 14 hours, from 10 hours to 12 hours, from 12 hours to 20 hours, from 12 hours to 18 hours, from 12 hours to 16 hours, from 12 hours to 14 hours, from 14 hours to 20 hours, from 14 hours to 18 hours, from 14 hours to 16 hours, from 16 hours to 20 hours, from 16 hours to 18 hours, or from 18 hours to 20 hours.

Embodiments may include one or more calcination steps, which may be performed after drying. The calcination may be performed in static air at a temperature of from 500° C. to 600° C., from 500° C. to 580° C., from 500° C. to 560° C., from 500° C. to 540° C., from 500° C. to 520° C., from 520° C. to 600° C., from 520° C. to 580° C., from 520° C. to 560° C., from 520° C. to 540° C., from 540° C. to 600° C., from 540° C. to 580° C., from 540° C. to 560° C., from 560° C. to 600° C., from 560° C. to 580° C., or from 580° C. to 600° C. for a time period of from 6 hours to 12 hours, from 6 hours to 10 hours, from 6 hours to 8 hours, from 8 hours to 12 hours, from 8 hours to 10 hours, or from 10 hours to 12 hours. In embodiments, the temperature may be increased during calcination, which may occur at a ramping rate of from 2° C./minute to 5° C./minute, from 2° C./minute to 4° C./minute, from 2° C./minute to 3° C./minute, from 3° C./minute to 5° C./minute, from 3° C./minute to 4° C./minute, or from 4° C./minute to 5° C./minute.

In embodiments, the methods may further include one or more additional, optional activation steps. The activation steps may, for example, be necessary to activate the non-agglomerated, nano-sized ZSM-22 zeolite so that it may be utilized as a catalyst. In particular, such activation steps may be necessary for hydrocarbon cracking catalyst applications. For example, in embodiments, such activation steps may be utilized to produce H-ZSM-22 from Na-ZSM-22 or K-ZSM-22. As used in the present disclosure, "H-ZSM-22" refers to a ZSM-22 zeolite having hydrogen atoms at the ion exchange sites of the zeolite.

In embodiments, the activation steps may include ion exchange. In embodiments, during the ion exchange, the non-agglomerated, nano-sized ZSM-22 zeolite may be a calcined Na-ZSM-22 or K-ZSM-22, which may be protonated in order to remove the sodium or potassium from the silica-alumina zeolite framework. To remove the sodium or potassium, an ammonium nitrate solution may be used to exchange the silica-alumina zeolite framework to make a non-agglomerated, nano-sized ammonia-ZSM-22. The ammonium nitrate solution may be from 1.0 to 2.5 M, from 1.0 M to 2.0 M, or from 2.0 to 2.5 M. To perform the protonation, the weight ratio of ammonium nitrate solution to the ZSM-22 zeolite may be from 5:1 to 20:1, from 5:1 to 10:1, or from 10:1 to 20:1. The protonation may be performed by using electromagnetic heating or an electrical oven (not shown). In embodiments, the electromagnetic heating may be performed at a temperature from 70° C. to 90° C., from 70° C. to 85° C., from 70° C. to 80° C., from 70° C. to 75° C., from 75° C. to 90° C., from 75° C. to 85° C., from 75° C. to 80° C., from 80° C. to 90° C., from 80° C. to 85° C., or from 85° C. to 90° C. for approximately 10 minutes. The electrical oven may be operated at a temperature from 70° C. to 90° C., from 70° C. to 85° C., from 70° C. to 80° C., from 70° C. to 75° C., from 75° C. to 90° C., from 75° C. to 85° C., from 75° C. to 80° C., from 80° C. to 90° C., from 80° C. to 85° C., or from 85° C. to 90° C. for a time period from 120 minutes to 240 minutes, from 120 minutes to 220 minutes, from 120 minutes to 200 minutes, from 120 minutes to 180 minutes, from 120 minutes to 160 minutes, from 120 minutes to 140 minutes, from 140 minutes to 220 minutes, from 140 minutes to 200 minutes, from 140 minutes to 180 minutes, from 140 minutes to 160 minutes, from 160 minutes to 220 minutes, from 160 minutes to 200 minutes, from 160 minutes to 180 minutes, from 180 minutes to 220 minutes, from 180 minutes to 200 minutes, or from 200 minutes to 220 minutes.

In further embodiments, the ion exchanged non-agglomerated, nano-sized ammonia-ZSM-22 may then be washed with water one or more times, for example from 2 to 4 times, to remove the sodium, potassium and excess ammonium nitrate from the ion exchanged non-agglomerated, nano-sized ammonia-ZSM-22.

Embodiments may include one or more drying steps, which may be performed under air at a temperature of from 50° C. to 150° C., from 50° C. to 100° C., or from 100° C. to 150° C. for a time period of from 10 hours to 16 hours, from 10 hours to 14 hours, from 10 hours to 12 hours, from 12 hours to 16 hours, from 12 hours to 14 hours, or from 14 hours to 16 hours.

Embodiments may include one or more calcination steps, which may be performed after drying. The calcination may be performed in static air at a temperature of from 500° C. to 600° C., from 500° C. to 580° C., from 500° C. to 560° C., from 500° C. to 540° C., from 500° C. to 520° C., from 520° C. to 600° C., from 520° C. to 580° C., from 520° C. to 560° C., from 520° C. to 540° C., from 540° C. to 600° C., from 540° C. to 580° C., from 540° C. to 560° C., from 560° C. to 600° C., from 560° C. to 580° C., or from 580° C. to 600° C. for a time period of from 10 hours to 12 hours, from 10 hours to 11 hours, or from 11 hours to 12 hours. In one embodiment, the ion exchanged non-agglomerated, nano-sized ammonia-ZSM-22 may be washed, dried, and then calcined to obtain non-agglomerated, nano-sized H-ZSM-22.

The features of the present embodiments will be further illustrated in the Examples which follow.

EXAMPLES

The following Examples illustrate one or more embodiments of the present disclosure.

Example 1: Non-Agglomerated, Nano-Sized ZSM-22 Zeolite Having a Crystal Size of 100-200 nm×50-100 nm (Length×Width) and a Silica/Alumina Ratio of 25

In Example 1, a weight of 1.8 kg of aluminum sulfate octadecahydrate was mixed with 88.4 kg of deionized water and then solution was injected to an aluminate unit. The aluminate unit operated at a temperature of 25° C. The aluminum sulfate octadecahydrate was mixed with the deionized water at a speed of 500 rpm for 15 minutes. Then, 8.5 kg of 1,6-diaminohexane introduced into the aluminate unit as a structure directing agent and stirred at a speed of 500 rpm for 15 minutes. Then, 4 kg of potassium hydroxide (purity 99%) was introduced as a mineralizing agent and stirred at a speed of 500 rpm for 15 minutes. Then, the aluminate solution was discharged and sent to a mechanical rotation drum unit.

Meanwhile, a weight of 27 kg of silica colloidal solution (30% in colloidal silica in water) and 47.5 kg deionized water was introduced into a silicate unit, which was operated at a temperature 25° C. with a stirring speed of 500 rpm for 15 minutes. Then, the solution was discharged and sent to a mechanical rotation drum unit.

The mechanical rotation drum unit equipped with a heating coil was operated at five stages to formulate the non-agglomerated, nano-sized ZSM-22 having a crystal size in a range of 100-200 nm (length) by 50-100 nm (width) and a Silica/Alumina ratio of 25. In the first stage, the drum rotation speed was operated at 500 rpm under 50° C. of heat applied via the heating coil of the mechanical rotation drum unit, and the drum rotation time was set for 120 min. In the second stage, the drum rotation speed was reduced to 48 rpm at 50° C. of heat applied via the heating coil, and the drum rotation time was set for 10 min. In the third stage, the heat was increased to 155° C. via the heating coil at a ramping heat rate of 10° C./min. In the fourth stage, the drum rotation speed was operated at 48 rpm under 155° C., and the drum rotation time was set for 48 hours. In the fifth stage, the heating and drum rotation were both stopped, and the mechanical rotation drum unit was allowed to cool at room temperate until the solution within the mechanical drum unit reached a temperature of 25° C. Then, the zeolite solution was discharged from the mechanical drum unit, and the contents of the unit were dried at 25° C. for 12 hours and calcined at 550° C. for 12 hours to produce the ZSM-22.

Figure 3:
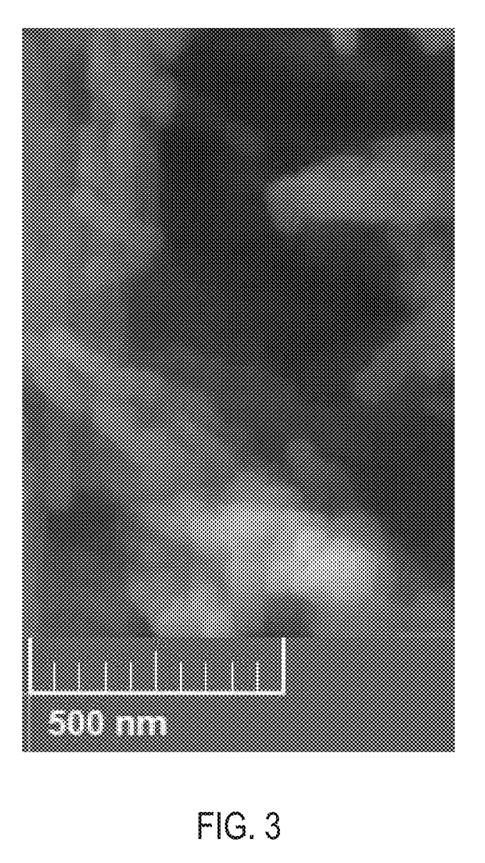
FIG. 3 is a scanning electron microscope (SEM) image of the ZSM-22 zeolite having a Silica/Alumina ratio of 25 in accordance with one or more embodiments.

The ZSM-22 produced in Example 1 had a crystal size ranging from 100-200 nm (length) by 50-100 nm (width) and a Silica/Alumina ratio of 25. FIG. 3 shows a scanning electron microscope (SEM) image of the ZSM-22 zeolite having a Silica/Alumina ratio of 25, which shows that the ZSM-22 crystals had a crystal size ranging from 100-200 nm (length) by 50-100 nm (width).

Example 2: Non-Agglomerated, Nano-Sized ZSM-22 Zeolite Having a Crystal Size of 100-200 nm×50-100 nm (Length×Width) and a Silica/Alumina Ratio of 50

In Example 2, a weight of 1.8 kg of aluminum sulfate octadecahydrate was mixed with 88.4 kg of deionized water and then solution was injected to an aluminate unit. The aluminate unit operated at a temperature of 25° C. The aluminum sulfate octadecahydrate was mixed with the deionized water at a speed of 500 rpm for 15 minutes. Then, 8.5 kg of 1,6-diaminohexane introduced into the aluminate unit as a structure directing agent and stirred at a speed of 500 rpm for 15 minutes. Then, 4 kg of potassium hydroxide (purity 99%) was introduced as a mineralizing agent and stirred a ta speed of 500 rpm for 15 minutes. Then, the aluminate solution was discharged and sent to a mechanical rotation drum unit.

Meanwhile, a weight of 54.1 kg of silica colloidal solution (30% in colloidal silica in water) and 28.6 kg deionized water was introduced into a silicate unit, which was operated at a temperature of 25° C. with a stirring speed of 500 rpm for 15 minutes. Then, the solution was discharged and sent to a mechanical rotation drum unit.

The mechanical rotation drum unit equipped with a heating coil was operated at five stages to formulate the non-agglomerated, nano-sized ZSM-22 having a crystal size ranging from 100-200 nm (length) by 50-100 nm (width) and a Silica/Alumina ratio of 50. In the first stage, the drum rotation speed was operated at 500 rpm under 50° C. of heat applied via the heating coil of the mechanical rotation drum unit, and the drum rotation time was set for 120 min. In the second stage, the drum rotation speed was reduced to 48 rpm under 50° C. of heat applied via the heating coil, and the drum rotation time was set for 10 min. In the third stage, the heat was increased to 155° C. via the heating coil at a ramping heat rate of 10° C./min. In the fourth stage, the drum rotation speed was operated at 48 rpm under 155° C., and the drum rotation time was set for 48 hours. In the fifth stage, the heating and drum rotation were both stopped, and the mechanical rotation drum unit was allowed to cool at room temperate until the solution within the mechanical drum unit reached a temperature of 25° C. Then, the zeolite solution was discharged from the mechanical drum unit, and the contents of the unit were dried at 25° C. for 12 hours and calcined at 550° C. for 12 hours to produce the ZSM-22.

Example 3: Non-Agglomerated, Nano-Sized ZSM-22 Zeolite Having a Crystal Size of 150-400 nm×100-250 nm (Length×Width) and a Silica/Alumina Ratio of 75

In Example 3, a weight of 1.8 kg of aluminum sulfate octadecahydrate was mixed with 69.5 kg of deionized water and then solution was injected to an aluminate unit. The aluminate unit operated at a temperature of 25° C. The aluminum sulfate octadecahydrate was mixed with the deionized water at a speed of 500 rpm for 15 minutes. Then, 8.5 kg of 1,6-diaminohexane introduced into the aluminate unit as a structure directing agent and stirred at a speed of 500 rpm for 15 minutes. Then, 4 kg of potassium hydroxide (purity 99%) was introduced as a mineralizing agent and stirred at a speed of 500 rpm for 15 minutes. Then, the aluminate solution was discharged and sent to a mechanical rotation drum unit.

Meanwhile, a weight of 81.1 kg of silica colloidal solution (30% in colloidal silica in water) and 28.6 kg deionized water was introduced into a silicate unit, which was operated at a temperature of 25° C. with a stirring speed of 500 rpm for 15 minutes. Then, the solution was discharged and sent to a mechanical rotation drum unit.

The mechanical rotation drum unit equipped with a heating coil was operated at five stages to formulate the non-agglomerated, nano-sized ZSM-22 having a crystal size ranging from 150-400 nm (length) by 100-250 nm (width) and a Silica/Alumina ratio of 75. In the first stage, the drum rotation speed was operated at 500 rpm under 50° C. of heat applied via the heating coil of the mechanical rotation drum unit, and the drum rotation time was set for 120 min. In the second stage, the drum rotation speed was reduced to 48 rpm under 50° C. of heat applied via the heating coil, and the drum rotation time was set for 10 min. In the third stage, the heat was increased to 155° C. via the heating coil at a ramping heat rate of 10° C./min. In the fourth stage, the drum rotation speed was operated at 48 rpm under 155° C., and the drum rotation time was set for 48 hours. In the fifth stage, the heating and drum rotation were both stopped, and the mechanical rotation drum unit was allowed to cool at room temperate until the solution within the mechanical drum unit reached a temperature of 25° C. Then, the zeolite solution was discharged from the mechanical drum unit.

Example 4: Non-Agglomerated, Nano-Sized ZSM-22 Zeolite Having a Crystal Size of 150-400 nm×100-250 nm (Length×Width) and a Silica/Alumina Ratio of 100

In Example 4, a weight of 1.8 kg of aluminum sulfate octadecahydrate was mixed with 50.5 kg of deionized water and then solution was injected to an aluminate unit. The aluminate unit operated at a temperature of 25° C. The aluminum sulfate octadecahydrate was mixed with the deionized water at a speed of 500 rpm for 15 minutes. Then, 8.5 kg of 1,6-diaminohexane introduced into the aluminate unit as a structure directing agent and stirred at a speed of 500 rpm for 15 minutes. Then, 4 kg of potassium hydroxide (purity 99%) was introduced as a mineralizing agent and stirred at a speed of 500 rpm for 15 minutes. Then, the aluminate solution was discharged and sent to a mechanical rotation drum unit.

Meanwhile, a weight of 108.2 kg of silica colloidal solution (30% in colloidal silica in water) and 28.6 kg deionized water was introduced into a silicate unit, which was operated at a temperature of 25° C. with a stirring speed of 500 rpm for 15 minutes. Then, the solution was discharged and sent to a mechanical rotation drum unit.

The mechanical rotation drum unit equipped with a heating coil was operated at five stages to formulate the non-agglomerated, nano-sized ZSM-22 having a crystal size ranging from 150-400 nm (length) by 100-250 nm (width) and a Silica/Alumina ratio of 100. In the first stage, the drum rotation speed was operated at 500 rpm under 50° C. of heat applied via the heating coil of the mechanical rotation drum unit, and the drum rotation time was set for 120 min. In the second stage, the drum rotation speed was reduced to 48 rpm under 50° C. of heat applied via the heating coil, and the drum rotation time was set for 10 min. In the third stage, the heat was increased to 155° C. via the heating coil at a ramping heat rate of 10° C./min. In the fourth stage, the drum rotation speed was operated at 48 rpm under 155° C., and the drum rotation time was set for 48 hours. In the fifth stage, the heating and drum rotation were both stopped, and the mechanical rotation drum unit was allowed to cool at room temperate until the solution within the mechanical drum unit reached a temperature of 25° C. Then, the zeolite solution was discharged from the mechanical drum unit. Then, the zeolite solution was discharged from the mechanical drum unit, and the contents of the unit were dried at 25° C. for 12 hours and calcined at 550° C. for 12 hours to produce the ZSM-22.

Figure 4:
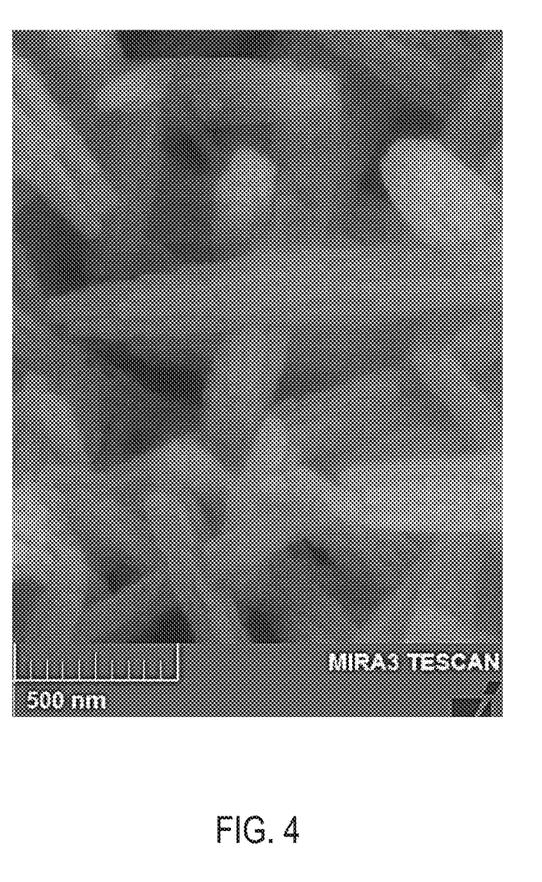
FIG. 4 is an SEM image of the ZSM-22 zeolite having a Silica/Alumina ratio of 100 in accordance with one or more embodiments.

The ZSM-22 produced in Example 4 had a crystal size ranging from 150-400 nm (length) by 100-250 nm (width) and a Silica/Alumina ratio of 100. FIG. 4 shows an SEM image of the ZSM-22 zeolite having a Silica/Alumina ratio of 100, which shows that the ZSM-22 crystals were non-agglomerated and had a size of 150-400 nm (length) by 100-250 nm (width).

Example 5: Comparative ZSM-22 Sample Having a Silica/Alumina Ratio of 50

In Example 5, a weight of 1.8 kg of aluminum sulfate octadecahydrate was mixed with 88.4 kg of deionized water and then solution was injected to an aluminate unit. The aluminate unit operated at a temperature of 25° C. The aluminum sulfate octadecahydrate was mixed with the deionized water at a speed of 500 rpm for 15 minutes. Then, 8.5 kg of 1,6-diaminohexane introduced into the aluminate unit as a structure directing agent and stirred at a speed of 500 rpm for 15 minutes. Then, 4 kg of potassium hydroxide (purity 99%) was introduced as a mineralizing agent and stirred at a speed of 500 rpm for 15 minutes. Then, the aluminate solution was discharged and sent to a mechanical rotation drum unit.

Meanwhile, a weight of 54.1 kg of silica colloidal solution (30% in colloidal silica in water) and 28.6 kg deionized water was introduced into a silicate unit, which was operated at a temperature of 25° C. with a stirring speed of 500 rpm for 15 minutes. Then, the solution was discharged and sent to a mechanical rotation drum unit, which was not rotated, and the aluminate solution and silicate solution were aged for a crystallization time of 48 hours. Then, the zeolite solution was discharged from the mechanical drum unit, and the contents of the unit were dried at 25° C. for 12 hours and calcined at 550° C. for 12 hours to produce the ZSM-22.

The ZSM-22 produced in Example 5 had a crystal size of greater than 10 μm (length) by 5-20 nm (width) and a Silica/Alumina ratio of 50.

Figure 5:
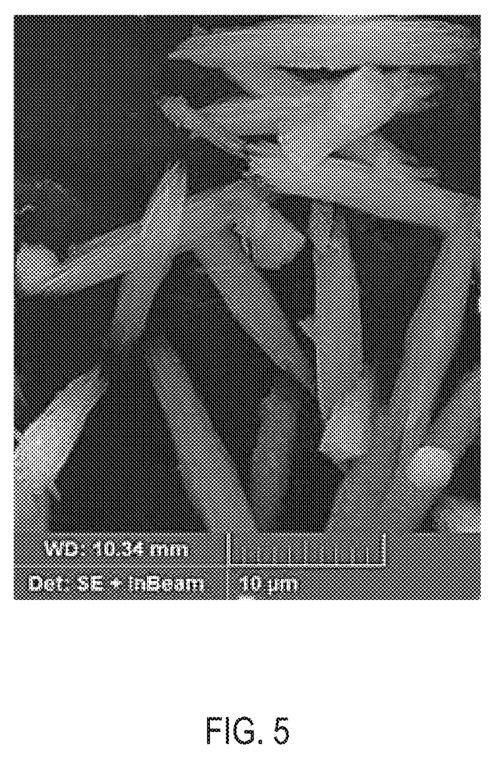
FIG. 5 is an SEM image of a Comparative ZSM-22 zeolite having a Silica/Alumina ratio of 50.

FIG. 5 shows an SEM image of the Comparative ZSM-22 zeolite having a Silica/Alumina ratio of 50, which was produced while the mechanical rotation drum unit was off. The SEM image of FIG. 5 shows that the ZSM-22 crystals had a length of greater than 10 μm and were agglomerated.

Example 6

In Example 6, the non-agglomerated, nano-sized ZSM-22 having a silica/alumina ratio of 50 (Example 2) was used for catalytic cracking of hydrocarbon to produce olefins from hydrocarbon. The heavy naphtha feed of n-dodecane (boiling point 216° C.) was pre-heated at 150° C. and injected to a fixed bed reactor by using a metering pump. The pressure of the reactor was ambient and the liquid space velocity was adjusted at 2 hourly and reaction temperature was set at 400° C. The catalytic cracking result is tabulated in Table 1.

TABLE 1

Conversion of n-dodecane feed over nano-structured ZSM-22

| Time of stream (hours) | Conversion (vol. %) | Selectivity (olefins vol. %) |
| --- | --- | --- |
| ½ hour | 38% | 41% |
| 2 hour | 34% | 45% |
| 3 hour | 31% | 46 |

It is noted that the terms "substantially" and "about" may be utilized to represent the inherent degree of uncertainty that may be attributed to any quantitative comparison, value, measurement, or other representation. These terms are also utilized to represent the degree by which a quantitative representation may vary from a stated reference without resulting in a change in the basic function of the subject matter at issue.

Unless otherwise defined, all technical and scientific terms used have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

While particular embodiments have been illustrated and described, it should be understood that various other changes and modifications may be made without departing from the spirit and scope of the claimed subject matter. Moreover, although various aspects of the claimed subject matter have been described, such aspects need not be utilized in combination. It is therefore intended that the appended claims cover all such changes and modifications that are within the scope of the claimed subject matter.

What is claimed is:

1. A method of synthesizing a non-agglomerated, nano-sized ZSM-22 zeolite, the method comprising:
passing a silica solution and an aluminate solution into a mechanical rotation drum unit;
operating the mechanical rotation drum unit at a first temperature of from 40° C. to 60° C. and a first speed of from 200 rpm to 1000 rpm for a first time period of from 1.3 hours to 2.7 hours;
operating the mechanical rotation drum unit at a second speed of from 30 rpm to 90 rpm for a second time period of from 0.05 hours to 0.4 hours;
heating the mechanical rotation drum unit at a ramping temperature of from 8° C./minute to 12° C./minute to a second temperature of from 115° C. to 185° C. at the second speed of from 30 rpm to 90 rpm;
operating the mechanical rotation drum unit at the second temperature of from 115° C. to 185° C. and the second speed of from 30 rpm to 90 rpm for a third time period of from 30 hours to 90 hours; and
cooling the mechanical rotation drum unit at a fourth speed of 0 rpm to produce the non-agglomerated, nano-sized ZSM-22 zeolite; and
wherein the non-agglomerated, nano-sized ZSM-22 zeolite comprises crystals each having a length within a range of from 100 nanometers to 400 nanometers and a width within a range of from 50 nanometers to 250 nanometers.

2. The method of claim 1, wherein the mechanical rotation drum unit is cooled to a temperature of from 20° C. to 50° C.

3. The method of claim 1, further comprising drying the non-agglomerated, nano-sized ZSM-22 zeolite.

4. The method of claim 1, further comprising calcining the non-agglomerated, nano-sized ZSM-22 zeolite.

5. The method of claim 1, further comprising activating the non-agglomerated, nano-sized ZSM-22 zeolite to produce an active catalyst.

6. The method of claim 1, wherein the non-agglomerated, nano-sized ZSM-22 zeolite comprises crystals each having a length within a range of from 100 nanometers to 200 nanometers and a width within a range of from 50 nanometers to 100 nanometers.

7. The method of claim 1, wherein the non-agglomerated, nano-sized ZSM-22 zeolite comprises crystals each having a length within a range of from 150 nanometers to 400 nanometers and a width within a range of from 100 nanometers to 250 nanometers.

8. The method of claim 1, wherein the non-agglomerated, nano-sized ZSM-22 zeolite has a silica/alumina ratio of from 25 to 100.

9. A method of synthesizing a non-agglomerated, nano-sized ZSM-22 zeolite, the method comprising:
passing a silica solution and an aluminate solution into a mechanical rotation drum unit; and
operating the mechanical rotation drum unit at five stages to produce the non-agglomerated, nano-sized ZSM-22 zeolite;
wherein:
the first stage operates at a first mixing speed of from 200 rpm to 1000 rpm and at a first time period of from 1.3 hours to 2.7 hours;
the second stage operates at a second mixing speed of from 30 rpm to 90 rpm and at a second time period of from 0.05 hours to 0.4 hours;
the third stage operates at a third mixing speed of from 30 rpm to 90 rpm and at a third time period of from 0.05 hours to 0.4 hours;
the fourth stage operates at a fourth mixing speed of from 30 rpm to 90 rpm and at a first time period of from 30 hours to 90 hours; and
the fifth stage operates at a fifth mixing speed of 0 rpm.

10. The method of claim 9, wherein the first stage operates at a temperature of from 40° C. to 60° C.

11. The method of claim 9, wherein the second stage operates at a temperature of from 40° C. to 60° C.

12. The method of claim 9, wherein the fourth stage operates at a temperature of from 115° C. to 185° C.

13. The method of claim 9, wherein the fifth stage operates at a temperature of from 20° C. to 50° C.

14. The method of claim 9, wherein the third stage operates a ramping temperature of from 8° C./minute to 12° C./minute.

15. The method of claim 9, further comprising producing the silica solution in a silicate unit; producing the aluminate solution in an aluminate unit; and combining the silica solution and the aluminate solution prior to passing the silica solution and the aluminate solution into the mechanical rotation drum unit.

16. The method of claim 9, further comprising activating the non-agglomerated, nano-sized ZSM-22 zeolite to produce an active catalyst.

17. The method of claim 9, wherein the non-agglomerated, nano-sized ZSM-22 zeolite comprises crystals each having a length within a range of from 100 nanometers to 400 nanometers and a width within a range of from 50 nanometers to 250 nanometers.

18. The method of claim 17, wherein the non-agglomerated, nano-sized ZSM-22 zeolite comprises crystals each having a length within a range of from 100 nanometers to 200 nanometers and a width within a range of from 50 nanometers to 100 nanometers.

19. The method of claim 17, wherein the non-agglomerated, nano-sized ZSM-22 zeolite comprises crystals each having a length within a range of from 150 nanometers to 400 nanometers and a width within a range of from 100 nanometers to 250 nanometers.

20. The method of claim 9, wherein the non-agglomerated, nano-sized ZSM-22 zeolite has a silica/alumina ratio of from 25 to 100.

* * * * *